United States Patent [19]

Urayama

[11] 3,934,762
[45] Jan. 27, 1976

[54] APPARATUS HAVING VIBRATING PLATES FOR FEEDING POWDERED MATERIAL
[75] Inventor: Kiyoshi Urayama, Kyoto, Japan
[73] Assignee: Kabushiki Kaisha Hosokawa Funtai Kogaku Kenkyusho, Osaka, Japan
[22] Filed: Dec. 20, 1974
[21] Appl. No.: 535,117

[52] U.S. Cl. .............................. 222/200
[51] Int. Cl.² .......................... B65G 65/70
[58] Field of Search .......... 222/161, 198, 199, 200; 241/249

[56] References Cited
UNITED STATES PATENTS

| | | | |
|---|---|---|---|
| 949,400 | 2/1910 | McAfee | 222/199 |
| 2,485,832 | 10/1949 | Keagle | 222/200 X |
| 3,193,153 | 7/1965 | Hosokawa | 222/199 |
| 3,853,247 | 12/1974 | Wahl | 222/199 |

Primary Examiner—Stanley H. Tollberg
Assistant Examiner—David A. Scherbel
Attorney, Agent, or Firm—Edwin E. Greigg

[57] ABSTRACT

Apparatus including vibrating plates which are vibrated and oscillated to cause a powdered material placed thereon to flow down at a constant rate from the peripheral edges of the plates.

7 Claims, 7 Drawing Figures

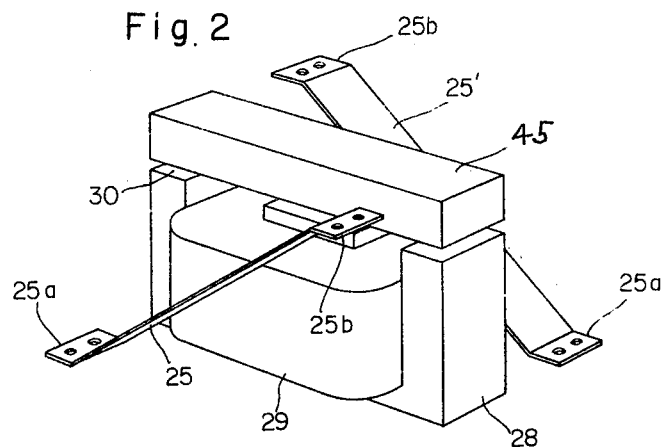
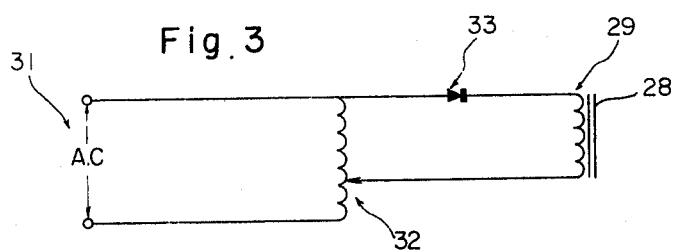
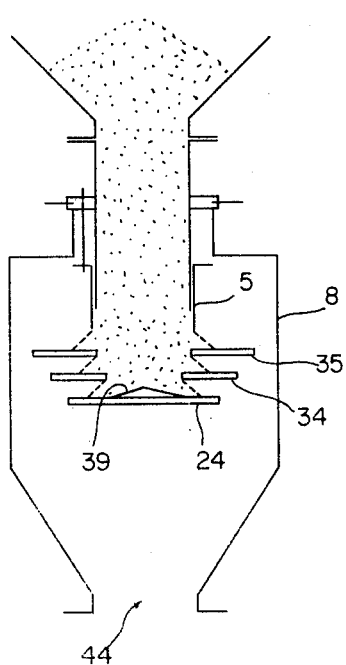
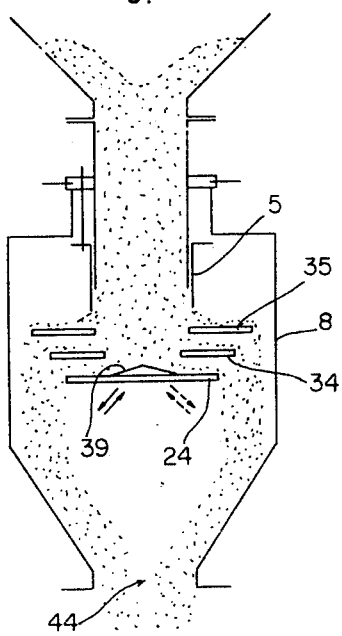

APPARATUS HAVING VIBRATING PLATES FOR FEEDING POWDERED MATERIAL

BACKGROUND OF THE INVENTION

The present invention relates to an apparatus for continuously feeding a powdered material such as talc, calcium carbonate, portland cement and the like at an approximately constant rate for a period of time. More particularly, this invention relates to improvements in the apparatus disclosed in U.S. Pat. No. 3,193,153 and which comprises a receiving member having a substantially horizontal receiving surface, a feed tube for feeding a powdered material onto the receiving member, and means for vibrating the receiving member to cause the powdered material on the receiving member to flow down from the peripheral edge of the receiving member.

In order to feed a powdered material at a greatly increased rate per unit time by the apparatus described above, the apparatus requires a larger floor space for installation or the operation entails frequent and marked variations of the feed rate.

More specifically, use of a receiving member of a larger diameter to raise the feed rate enlarges the apparatus in horizontal dimensions, increasing the floor space required, whilst if it is attempted to increase the thickness of layer of the powdered material on the receiving member to feed the material at a higher rate, adhesion between the particles of the material exerts a growing influence to produce more pronounced irregularities in the flow of the powdered material over the peripheral edge, consequently resulting in marked variations of the feed rate.

SUMMARY OF THE INVENTION

A main object of this invention is to provide an apparatus of the type is which a receiving member is vibrated and oscillated to cause a powdered material on the receiving member to flow down and which is compact and capable on continuously feeding the powdered material at a greatly increased constant rate free of frequent and marked variations without necessitating an increased floor space for installation.

The apparatus of the present invention comprising a first receiving member having a substantially horizontal receiving surface, a feed tube for feeding the powdered material onto the first receiving member, and means for vibrating the first receiving member to cause the powdered material on the first receiving member to flow down from the peripheral edge of the first receiving member, is characterized in that at least one second receiving member having a substantially horizontal surface for receiving the powdered material from the feed tube and an opening substantially concentric with the feed tube is interposed between the first receiving member and the feed tube and vertically spaced apart from both the first receiving member and the feed tube, whereby the powdered material placed on the second receiving member is made to flow down outside of the first receiving member from the peripheral edge of the second receiving member when the second receiving member is vibrated and oscillated by the vibrating means.

Thus since a plurality of receiving members are disposed one above another to cause a powdered material to flow down simultaneously from the peripheral edges of the receiving members, the receiving members have an increased overall peripheral length, permitting a remarkable and yet desired increase in the feed rate of powdered material.

The overall periphery of the receiving members which is lengthened to assure a higher feed rate makes it possible to reduce the thickness of layer of the powdered material on the peripheral portion relative to the feed rate and to thereto reduce the variations of the feed rate.

Another object of this invention is to provide an apparatus for feeding a powdered material of the vibratory and oscillatory type which is capable of easily accurately controlling the feed rate over a wide range.

Other objects and advantages of this invention will become more apparent from the following description.

BRIEF DESCRIPTION OF THE DRAWINGS

FIG. 2 is a perspective view showing vibrating means included in the apparatus;

FIG. 3 is a diagram showing a electric circuit for the vibrating means;

FIG. 4 is a diagram showing the apparatus during operation when receiving members are brought to a halt;

FIG. 5 is a diagram showing the apparatus during operation with the receiving members in vibratory and oscillatory motion.

DESCRIPTION OF THE PREFERRED EMBODIMENT

Figure 1:
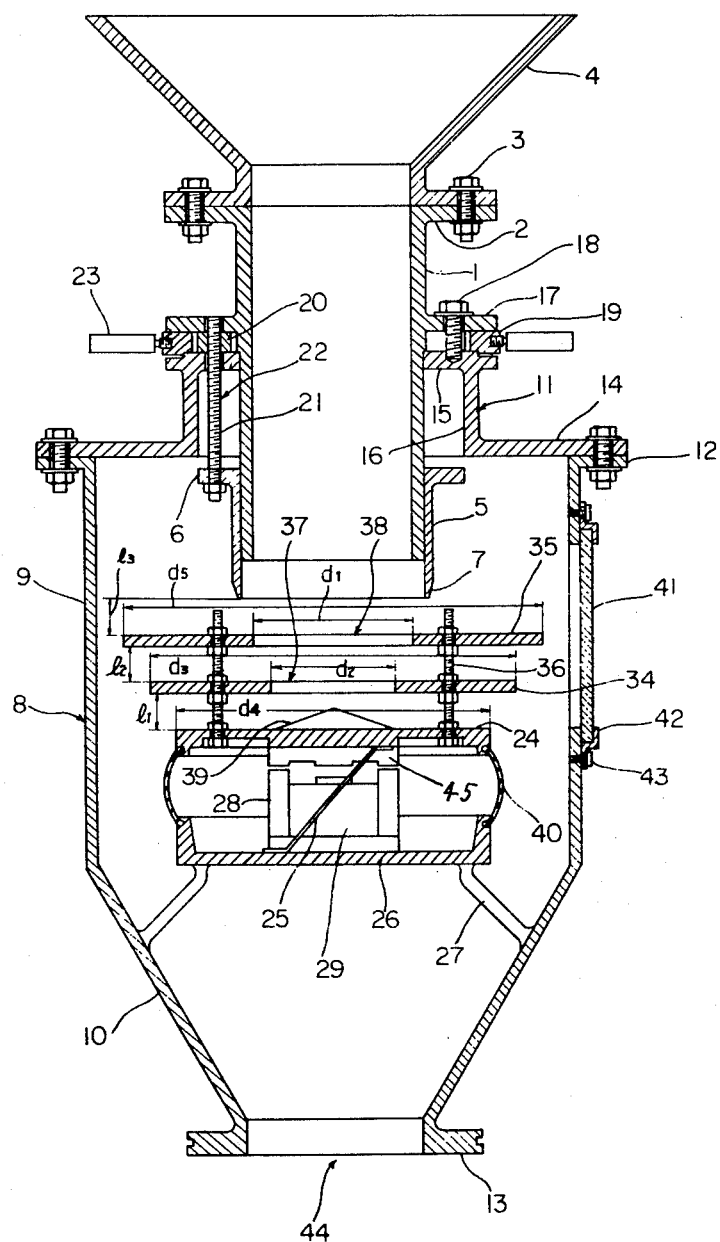
FIG. 1 is a view in vertical section showing an apparatus of this invention with part omitted.

A substantially cylindrical feed tube 1 has at its upper end a flange 2 to which a hopper 4 is fixed with bolts and nuts 3. A tube 5 substantially circular in cross section and slidably fitted around the lower end of the feed tube 1 has a flange 6 at its upper end and a tapered portion 7 at its lower end.

A case 8 includes a substantially cylindrical upper portion 9 and a funnel-shaped lower portion 10. The cylindrical portion 9 is provided at its upper end with a flange 12 for mounting an annular element 11, whilst the funnel-shaped portion 10 has at its lower end a flange 13 to which suitable receiving means is to be attached. The annular element 11 includes two ring-like walls 14 and 15 vertically spaced apart from each other and a vertical connecting wall 16. The annular element 11 serves as a cover for the case 8 and is intimately fitted around the feed tube 1. The feed tube 1 has an annular flange 17 positioned below and spaced apart from the flange 2. The flange 17 is secured by bolts 18 to the ring-like wall 15 as spaced apart therefrom.

Rotatably disposed in the space between the wall 15 and the flange 17 is a ring gear 19 having a toothed inner surface and meshing with a plurality of pinions 20 provided in the above-mentioned space. Each of the pinions 20 is in engagement with a threaded rod 21 which, by means of threads 22, is movable only upward and downward relative to the wall 15 and to the flange 17. The lower end of the rod 21 is fixed to the flange 6. The ring gear 19 has at least one handle 23 which extends outward from the space and which, when turned, rotates the gear 19 and pinions 20, causing the rods 21 to move upward or downward to shift the tube 5 vertically.

A first receiving member 24 substantially in the form of a disk is supported by two plate springs 25 and 25' secured to a platform 26. The first receiving member 24 is positioned below the feed tube 1 and is substantially concentric therewith. The platform 26 is supported by arm 27 extending inward from the inner surface of the funnel-shaped portion 10 and has a low peripheral wall. Mounted on the platform 26 is a yoke 28 made of a magnetic material and having a winding 29 fitted around the center leg of the yoke 28.

As more apparently shown in FIG. 2, the plate springs 25 and 25' are positioned on the opposite sides of the yoke 28 as opposed to each other, slanting in opposite directions to each other. The lower ends 25a of the plate springs 25 and 25' are fixed to the platform 26, while the upper ends 25b, thereof are fixed to the first receiving member 24. A bar 45 made of a magnetic material is secured to the under surface of the first receiving member 24 and is normally spaced apart from the upper end of the yoke 28, with an air gap 30 formed between the bar 45 and yoke 28. As illustrated in FIG. 3, the winding 29 is connected to an A.C. power supply 31 by way of a transformer 32 and a half-wave rectifier 33. The amplitude of the first receiving member 24 is variable through the voltage control by the transformer 32. When energized, the winding 29 vibrates the first receiving member up and down and, at the same time, oscillates the receiving member in rotational direction in a horizontal plane under the action of the plate springs 25 and 25'.

Two annular second receiving members 34 and 35, vertically spaced apart from each other on substantially horizontal planes, are interposed between the tube 5 and the first receiving member 24 and secured to the first receiving member 24 by bolts and nuts 36. The second receiving members are concentric with the tube 5 and the first receiving member 24. The upper second receiving member 35 is formed with an opening 38 having a diameter $d_1$ which is larger than the diameter $d_2$ of an opening 37 of the lower second receiving member 34. The outer diameter $d_3$ of the lower receiving member 34 is larger than the outer diameter $d_4$ of the first receiving member 24, the outer diameter $d_5$ of the upper second receiving member 35 being larger than the outer diameter $d_3$ of the lower second receiving member 34. The second receiving members 34 and 35 are each shiftable by means of the bolts and nuts 36 to vary the distance $l_1$ between the first receiving member 24 and the lower second receiving member 34, the distance $l_2$ between the two second receiving members 34 and 35, and the distance $l_3$ between the upper second receiving member 35 and the lower end of the tube 5. Both the second receiving members 34 and 35 are vibrated and oscillated with the first receiving member 24.

Provided on the upper surface of the first receiving member 34 is a conical member 39 which is substantially concentric therewith and coaxial with the feed tube 1 and has a sharp end facing up. The member 39 assures that the powdered material on the first receiving member 24 will flow smoothly toward its peripheral edge.

In order to render the air gap 30 free of the powdered material, a flexible band 40 made of rubber or synthetic resin is fixed by suitable means to the peripheries of the first receiving member 24 and the platform 26, the band 40 completely enclosing the space therebetween.

For the inspection of the interior of the case 8, the cylindrical portion 9 has an opening which is covered with a transparent or semitransparent plate 41 of glass, synthetic resin or the like. The plate 41 is secured to the case 8 by a frame 42 and bolts 43.

The powdered material sent into the feed tube 1 from the hopper 4 is placed onto the first and second receiving members 24, 34, 35 as seen in FIG. 4. Because the foregoing distances $l_1$, $l_2$, $l_3$ are each determined taking into account the angle of repose of the powdered material and the outer diameters $d_3$, $d_4$, $d_5$ of the receiving members 24, 34, 35, the powdered material will not flow down from the peripheral edges of the receiving members 24, 34, 35 while these members are out of motion. When an electric current is passed through the winding 29, the receiving members 24, 34, 35 are brought into vibration and oscillation, whereby the powdered material on the receiving members 24, 34, 35 is moved and made to flow down from the peripheral edges thereof. Consequently, the powdered material is continuously led to an outlet 44 at the lower end of the case 8 as shown in FIG. 5.

The amount of the powdered material flowing down from the receiving members 24, 34, 35 per unit time is dependent on the amplitude and frequency of the receiving members, 24, 34, 35, the length of overall periphery of the receiving members, the distances $l_1$, $l_2$, $l_3$ and properties of the powdered material, etc. If these conditions are fixed, the flow will be maintained at a substantially constant rate. Although a higher flow rate can be easily achieved by increasing the number and/or diameters of the receiving members 24, 34, 35 and/or by increasing the above-mentioned distances $l_1$, $l_2$, $l_3$, it is preferable to reduce the distances $l_1$, $l_2$, $l_3$ and the outer diameters $d_3$, $d_4$, $d_5$ of the receiving members 24, 34, 35, using an increased number of the second receiving members so as to reduce the variations of the flow rate and to minimize the horizontal dimensions of the apparatus.

The hopper 4 included in the apparatus of this invention may be replaced by a material container used in a bag filter or cyclone collector.

The shape of the first and second receiving members 24, 34, 35 in plan view and the cross sectional shape of the feed tube 5 may be optional. For example, they may be in a triangular, square, polygonal form or of any other irregular form. The number of the second receiving members, which must be at least one, is variable in accordance with the feed rate desired.

The means for vibrating and oscillating the first and second receiving members 24, 34, 35 may be of any known construction. For instance, an electric motor or internal combustion engine is usable in the combination with a crank mechanism or eccentric arm. Accordingly, these means are generally referred to as "vibrating means." The receiving members 24, 34, 35 may be vibrated and oscillated by the vibrating means, for example, in a mere vertical direction, vertically slanting direction, horizontal direction, rotational direction on a horizontal plane or in these directions in a desired combination.

When the plurality of receiving members 34 and 35 are employed, the powdered material can be advantageously distributed onto each of the first and second receiving members smoothly, if the opening 38 of the upper member is larger than the opening 37 of the lower member. However, all the openings 37 and 38 may have the same dimensions, or the lower opening 37 may be made larger than the upper opening 38.

Given below are the results of experiments conducted using an apparatus embodying this invention.

The first receiving member 24 used was in the form of a disk having a diameter of 200 mm. The second receiving members 34 and 35 employed were in the form of a disk measuring 215 mm in outer diameter and were formed with concentric openings of 135 mm in diameter. A cylinder 120 mm in inner diameter was used as the feed tube 1. Used as the vibrating means was a vibrator including an electromagnetic winding which vibrated, at 1,800 Hz/min., in a direction inclined at an angle of about 45° with a horizontal plane, along an imaginary cylindrical plane having a vertical axis. When the voltage applied to the winding was 40 volts, the resulting amplitude was 0.1 mm, whilst when the voltage was 120 volts, the vibrator gave an amplitude of 2.0 mm. The amplitude varied substantially rectilinearly when the voltage was varied between these voltage levels. Heavy calcium carbonate powder was used as the powdered material.

EXPERIMENT I

Figure 6:
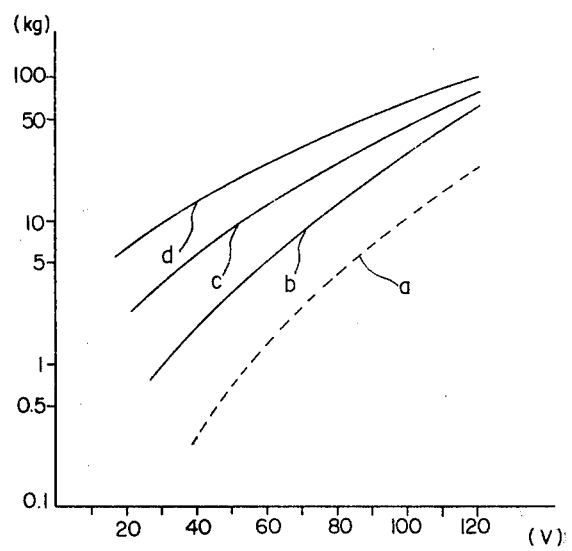
FIGS. 6 and 7 are graphs showing the results of experiments.

FIG. 6 shows the relationship, as actually determined, between the number of the second receiving members and the amount of the powdered material fed by the entire apparatus.

In FIG. 6 the amount of the powdered material fed per minute is plotted as ordinate vs. the voltage applied to the vibrator as abscissa. Dotted line $a$ represents the results obtained when the first receiving member alone was used as spaced from the feed tube by a distance of 30 mm, namely by the largest distance permitting the heavy calcium carbonate powder to form an angle of repose on the first receiving member. Solid line $b$ represents the results obtained when one second receiving member was provided between the first receiving member and the feed tube, as spaced apart by 20 mm from each of the member and the tube, the second receiving member being arranged concentrically therewith. Solid line $c$ represents the results obtained when two second receiving members were used and solid line $d$, those obtained when three second receiving members were used. In the latter two cases, the distance between the first receiving member and the lowermost second receiving member, the distance between the second receiving members, and the distance between the feed tube and the uppermost second receiving member were all 20 mm, and the first and second receiving members and feed tube were arranged concentrically.

FIG. 6 reveals that the amount of the powdered material fed can be increased remarkably by using one or more second receiving members and also by increasing the number of the second receiving members. Moreover, despite the use of one or more second receiving members, the apparatus remains exactly the same in its horizontal dimensions, and little or no change results in its height.

EXPERIMENT II

Figure 7:
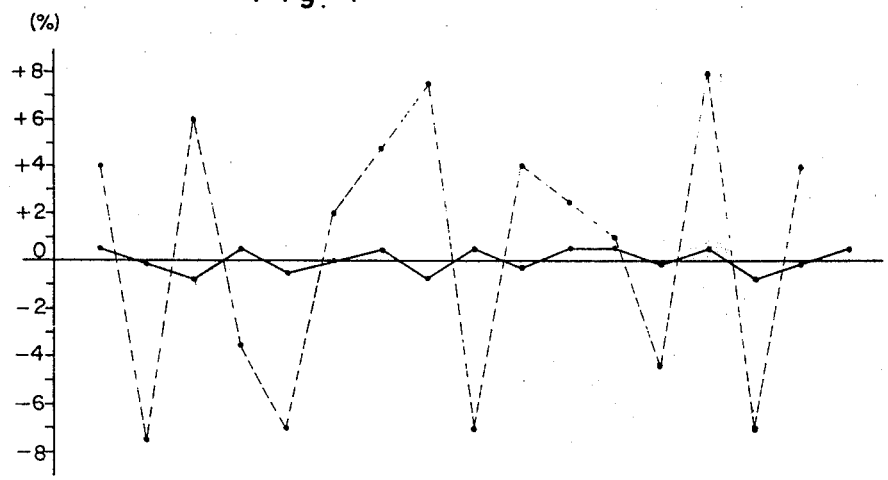

FIG. 7 shows the variations of the feed rate of powdered material as determined when the first receiving member alone was used and when two second receiving members were additionally employed, using the same apparatus as in Experiment I. The powdered material sent out from the apparatus was collected for every 60 seconds in succession, and the unit quantities of the material collected were weighed to calculate the average weight thereof. In FIG. 7 deviation is plotted as ordinate and the number of unit quantity, as abscissa. The deviation is given by:

$$\text{Deviation} = \frac{A - B}{B} \times 100 \, (\%),$$

wherein $A$ is the weight of unit quantity, and $B$ is the average weight of the unit quantities.

FIG. 7 shows that the use of the first receiving member only involves marked deviations (of more than $\pm 7$ percent) as represented by the dotted line, whereas the use of the second receiving members in combination therewith greatly reduces the deviations (to less than $\pm 1$ percent) as represented by the solid line. Thus the second receiving members remarkably reduce the variations of feed rate of the powdered material.

The results of Experiments I and II indicate that the apparatus according to this invention is capable of feeding a powdered material at a greatly increased rate with reduced variations, without employing an enlarged construction, and assures a continuous feeding operation with improved efficiency.

What we claim is:

1. An apparatus for feeding a powdered material comprising a first receiving member having a substantially horizontal receiving surface, a feed tube for feeding the powdered material onto the first receiving member, and means for vibrating the first receiving member to cause the powdered material on the first receiving member to flow down from a peripheral edge of the first receiving member, characterized in that at least one second receiving member having a substantially horizontal surface for receiving the powdered material from the feed tube and an opening substantially concentric with the feed tube is provided between the first receiving member and the feed tube and vertically spaced apart from both the first receiving member and the feed tube, whereby the powdered material placed on the second receiving member is made to flow down outside of the first receiving member from a peripheral edge of the second receiving member when the second receiving member is vibrated by the vibrating means.

2. The apparatus as set forth in claim 1 wherein a plurality of the second receiving members are vertically spaced apart from each other as provided between the first receiving member and the feed tube, each of the second receiving members permitting the powdered material to flow down therefrom outside of the receiving member positioned therebelow.

3. The apparatus as set forth in claim 2 wherein the vibrating means vibrates all the receiving members up and down and simultaneously oscillates the same in rotational direction each in a horizontal plane.

4. The apparatus as set forth in claim 3 wherein each of the receiving members is a disk.

5. The apparatus as set forth in claim 2 wherein the opening of each of the second receiving members has a larger diameter than the opening of another second receiving member positioned immediately therebelow.

6. The apparatus as set forth in claim 1 wherein the feed tube is provided at its lower portion with a tube which is shiftable axially of the feed tube.

7. The apparatus as set forth in claim 1 wherein a conical projection is formed on the receiving surface of the first receiving member substantially coaxially with the feed tube, with its sharp end facing up.

* * * * *